(12) United States Patent
Sheng et al.

(10) Patent No.: US 10,582,146 B2
(45) Date of Patent: Mar. 3, 2020

(54) PROJECTOR HAVING STACKED OPTICAL LAYERS

(71) Applicant: TEXAS INSTRUMENTS INCORPORATED, Dallas, TX (US)

(72) Inventors: Zhongyan Sheng, Allen, TX (US); Gavin Camillo Perrella, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/054,171

(22) Filed: Aug. 3, 2018

(65) Prior Publication Data

US 2019/0268563 A1  Aug. 29, 2019

Related U.S. Application Data

(60) Provisional application No. 62/579,603, filed on Oct. 31, 2017.

(51) Int. Cl.
| | |
|---|---|
| *G03B 21/00* | (2006.01) |
| *H04N 5/74* | (2006.01) |
| *G09G 3/34* | (2006.01) |
| *G02B 26/08* | (2006.01) |

(52) U.S. Cl.
CPC ....... *H04N 5/7458* (2013.01); *G02B 26/0833* (2013.01); *G02B 26/0841* (2013.01); *G03B 21/008* (2013.01); *G09G 3/346* (2013.01); *H04N 2005/7466* (2013.01)

(58) Field of Classification Search
CPC ......... H04N 5/7458; H04N 2005/7466; G02B 26/0841; G02B 26/0833; G09G 3/346; G03B 21/008
See application file for complete search history.

(56) References Cited

U.S. PATENT DOCUMENTS 7,655,492 B2 * 2/2010 Patel ..................... B81B 7/0077
257/E23.132
2003/0223046 A1 * 12/2003 Dho ...................... H04N 9/3105
353/31

* cited by examiner

*Primary Examiner* — Cara E Rakowski
*Assistant Examiner* — Magda Cruz
(74) *Attorney, Agent, or Firm* — Michael A. Davis, Jr.; Charles A. Brill; Frank D. Cimino

(57) ABSTRACT

A projector includes a semiconductor die including a digital micromirror device; and a first integral optical layer attached to the semiconductor die. The first integral optical layer includes a first optical lens and a first diffractive optical element. A second integral optical layer is attached to the first integral optical layer. The second integral optical layer includes an aperture stop and a second diffractive optical element. A third integral optical layer is attached to the second integral optical layer. The third integral optical layer includes a second optical lens and a light source mount. The semiconductor die, the first integral optical layer, the second integral optical layer and the third integral optical layer are stacked to form an optical path through the first and second diffractive optical elements, reflect off the digital micromirror device, and pass through the first optical lens, the aperture stop and the second lens.

19 Claims, 9 Drawing Sheets

PROJECTOR HAVING STACKED OPTICAL LAYERS

CROSS REFERENCE TO RELATED APPLICATION

The present application claims priority to U.S. Provisional Patent Application No. 62/579,603, filed Oct. 31, 2017, titled "Compact Optics for Dynamic Pattern Generation," which is hereby incorporated herein by reference in its entirety.

BACKGROUND

Projectors are used for various purposes, such as for the generation and display of static images, video, etc. Projectors have a variety of sizes and shapes, and are based on various different technologies.

SUMMARY

In one example, a projector includes: a semiconductor die including a digital micromirror device; and a first integral optical layer attached to the semiconductor die. The first integral optical layer includes a first optical lens and a first diffractive optical element. A second integral optical layer is attached to the first integral optical layer. The second integral optical layer includes an aperture stop and a second diffractive optical element. A third integral optical layer is attached to the second integral optical layer. The third integral optical layer includes a second optical lens and a mount for a light source. The semiconductor die, the first integral optical layer, the second integral optical layer and the third integral optical layer are stacked to form an optical path for light to: pass through the second diffractive optical element and the first diffractive optical element; reflect off the digital micromirror device; and pass through the first optical lens, the aperture stop and the second lens.

In another example, a projector includes: a semiconductor die including a digital micromirror device and a controller to provide control signals to the digital micromirror device. The projector also includes: a first integral optical layer including at least one of a first optical lens and a first diffractive optical element; a second integral optical layer including at least one of an aperture stop and a second diffractive optical element; and a third integral optical layer including at least one of a second optical lens and a mount for a light source. The semiconductor die, the first integral optical layer, the second integral optical layer and the third integral optical layer are stacked to form an optical path.

In yet another example, a method of forming a projector includes fabricating digital micromirror devices on a semiconductor wafer, forming first optical cells on a first integral optical layer, forming second optical cells on a second integral optical layer, and forming third optical cells on a third integral optical layer. The method further includes: attaching the semiconductor wafer and the first, second and third integral optical layers to form a stack; and singulating the stack into individual projectors. Each projector includes a respective one of the digital micromirror devices, a respective one of the first optical cells, a respective one of the second optical cells, and a respective one of the third optical cells.

DETAILED DESCRIPTION

Example embodiments are directed to a projector that includes a digital micromirror device (DMD) and various integral optical layers. In example embodiments, multiple DMDs are formed on a silicon wafer. Also, in example embodiments, multiple optical components may exist within an integral optical layer. In this description, the term "integral optical layer" means that such layer's optical components are structurally integral with such layer's physical structure. For example, the integral optical layer's optical components may be: (a) integrally formed within a single optically transparent wafer, such as a wafer made from optical plastic (plastic optical wafer) or optical glass (glass optical wafer); or (b) discretely formed as separate components, which are securely attached (such as by adhesive) to such layer's physical structure. The silicon wafer and the various integral optical layers are attached in a stacked arrangement, so that each projector's respective components (including DMD and optical components) optically align with each other. The various projectors formed in the stack of wafers are singulated from the stack of wafers. The resulting size of the DMD-based projector is small enough for the projector to be mounted in a smartphone, tablet device, or other type of portable device. For example, the projector is useful to generate one or more monochromatic patterns for a three-dimensional (3D) scan of an object.

Figure 1:
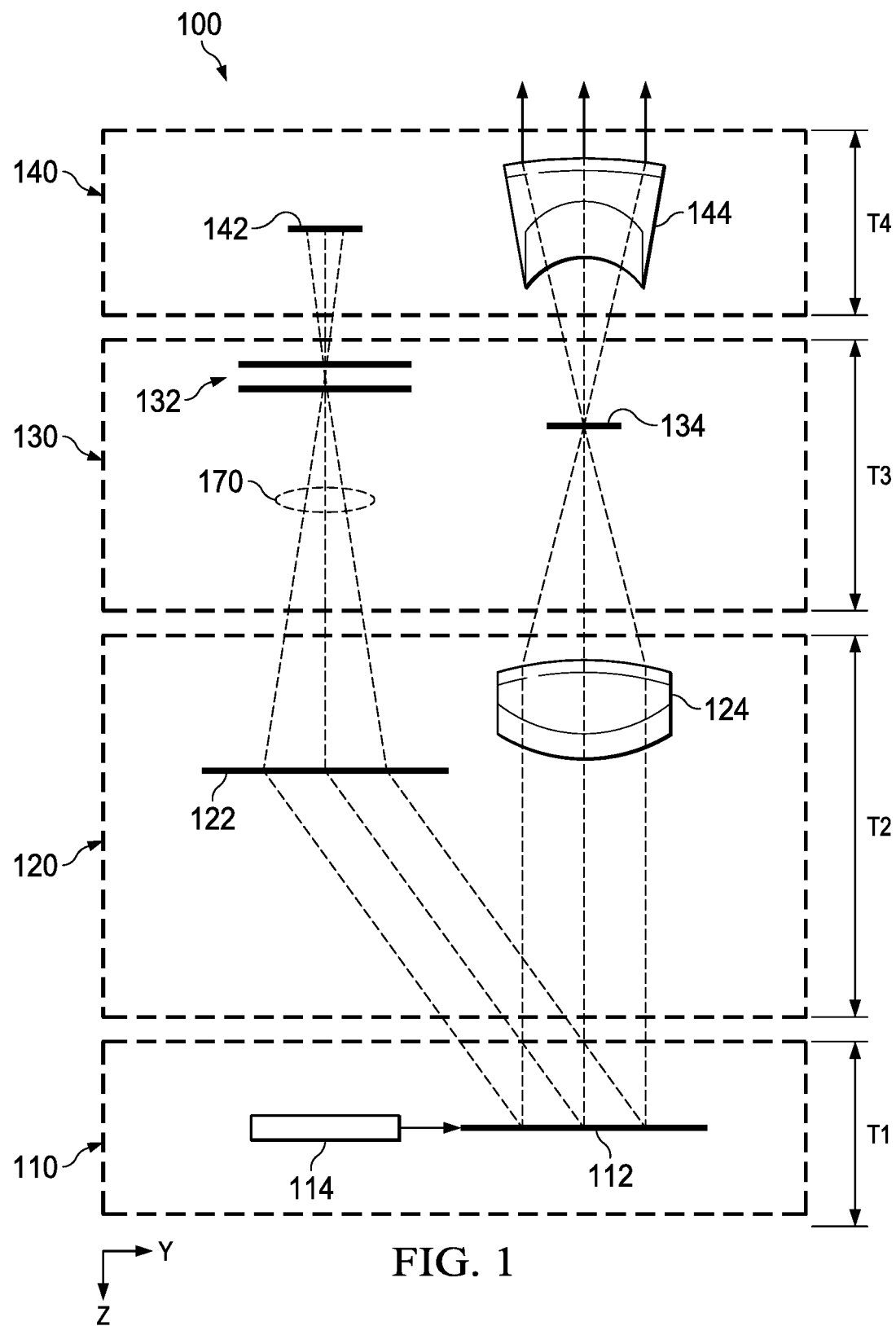
FIG. 1 is a schematic of an example digital micromirror device-based projector in accordance with an example.

FIG. 1 schematically illustrates components of a DMD-based projector 100. In this example, the DMD-based projector 100 includes a semiconductor die 110, a first integral optical layer 120, a second integral optical layer 130 and a third integral optical layer 140. The semiconductor die 110 and the integral optical layers 120, 130 and 140 are attached using an adhesive, such as an ultraviolet (UV) curable optical adhesive (e.g., NORLAND OPTICAL ADHESIVE 68 ("NOA68") from Norland Products Inc., 2540 Route 130, Suite 100, Cranbury, N.J. 08512).

The semiconductor die 110 includes a DMD 112 electrically coupled to a controller 114. In at least one example, the integral optical layers 120, 130 and 140 comprise an optical plastic, such as polycarbonate, polystyrene or poly(methyl methacrylate) (PMMA), but can comprise other types of optically transparent material. Each integral optical layer comprises one or more optical structures. In the example of FIG. 1, the first integral optical layer 120 includes a first diffractive optical element 122 and a first optical lens 124. The second integral optical layer 130 includes a second diffractive optical element 132 and an aperture stop 134. The third integral optical layer 140 includes: a mount 142 for a light source; and a second optical lens 144. A light source—such as a laser diode, a vertical-cavity surface-emitting laser (VCSEL) or a light emitting diode (LED)—can be attached to the mount 142. Light rays emanating from the light source follow an optical path defined by the second diffractive optical element 132, the first diffractive optical element 122, the DMD 112, the first optical lens 124, the aperture stop 134 and the second lens 144. Accordingly, the light from the light source passes first through the second diffractive element 132 and through the first diffractive optical element 122, reflects off the DMD 112, and then passes through the first optical lens 124, the aperture stop 134 and finally through the second lens 144.

The first diffractive optical element 132 collects and collimates light from the light source. The first diffractive optical element 132 can also homogenize the light distribution in the angular space. As a result, when light reaches the DMD 112, the light uniformly illuminates the entire surface of DMD 112. The second diffractive optical element 122 changes the beam direction and focuses the illumination light onto the DMD 112.

The first lens 124 collimates the light from the DMD 112 and forms a lens pupil on the plane of the aperture stop 134. The aperture stop 134 limits the angular size of the light cone that can propagate through the system. The second optical lens 144 focuses the light onto a plane, which is some distance away in space, forming an image generated by the DMD with a designated size.

The first lens 124, the aperture stop 134 and the second optical lens 144 function together to form an image of the pattern loaded into the DMD at a designated distance from the DMD-based projector 100 and with a designated image size. At the same time, the first lens 124, the aperture stop 134 and the second optical lens 144 function to ensure high coupling efficiency with the illumination light for minimal light loss in the system.

Each of the integral optical layers 120, 130 and 140 and the semiconductor die 110 has a respective thickness. The thickness of the semiconductor die 110 is T1. The thickness of the first integral optical layer 120 is T2. The thickness of the second integral optical layer 130 is T3. The thickness of the third integral optical layer 140 is T4. The sum of thicknesses T1, T2, T3 and T4 (i.e., T1+T2+T3+T4) is approximately 10 millimeters (mm) in some examples, and approximately 7 mm in other examples. Generally, the sum of T1+T2+T3+T4 is in the range from 5 mm to 12 mm.

Figure 2:
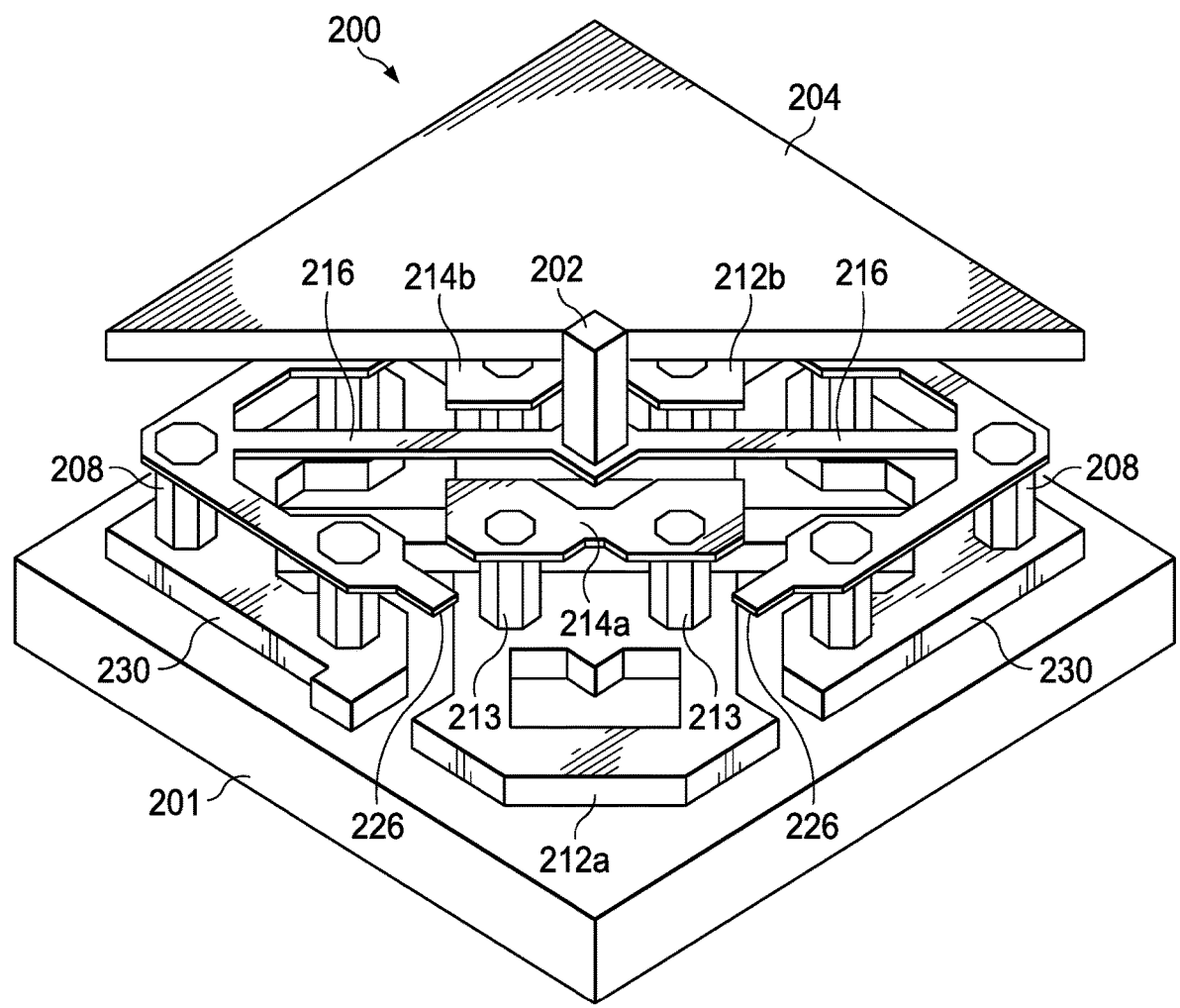
FIG. 2 shows an example of an individual digital micromirror device cell.

The DMD 112 of FIG. 1 comprises an array of mirrors (also termed "mirror cells"). Each mirror can be tilted to a first tilt angle and to a second tilt angle, and the respective tilt angle of each mirror is individually controllable by control signals generated by the controller 114. Each mirror is mechanically and electrically coupled to a corresponding torsion hinge by way of a conductive via. Each mirror can be made to rotate to one position or another (e.g., +/−12 degrees) or to a neutral position through application of suitable voltages to electrodes. FIG. 2 illustrates a single DMD mirror cell 200. An array of such mirror cells may be formed on a common semiconductor die 201. The DMD mirror cells 200 of FIG. 1A may include a hinge portion, an address portion, and a mirror portion. The hinge portion includes a hinge 216 (which may be a torsion hinge), supported on each side by hinge posts. Six bias vias 208 support spring tips 226 (two of which are shown in FIG. 1A, and two more exist but are hidden in this view) and hinge 216 above the lower layer 230. The bias vias 208 may also operate to relay a bias voltage to hinge 216. A mirror 204 (micromirror) is supported above the hinge 216 by a mirror via 202. In addition to providing support for the mirror 204, the mirror via 202 may conductively transfer the bias voltage to the mirror 204. The bias voltage may be conductively transferred to the spring tips 226 and hinge 216 through the six bias vias 208. The bias voltage may be further transferred from the hinge 216 to the mirror 204 through the mirror via 202.

The address portion of the DMD pixel element 200 includes two address pads 212a, 212b (collectively address pads 212) that connect to raised address electrodes 214a, 214b, respectively. As shown in FIG. 2, address vias 213 support the raised address electrodes 214a, 214b above each address pad 212a, 212b. In addition to supporting the raised address electrodes 214a, 214b, the address vias 213 relay a control or address voltage from the address pads 212a, 212b to the raised address electrodes 214a, 214b. The address pads 212a, 212b are communicatively coupled to control circuitry that is formed on the semiconductor die 201 and shown in other drawings, and which selectively applies a control or address voltage to one of the two address pads 212a, 212b to create an electrostatic force between the mirror 204 and the raised address electrodes 214a, 214b. A similar electrostatic force may be created between the mirror 204 and the address pads 212a, 212b.

The range of motion of the mirror 204 may be limited by spring tips 226. During operation of DMD micromirror cell 200, spring tips 226 provide a landing point for mirror 204. For example, when mirror 204 is tilted in the direction of the raised address electrode 214a and address pad 212a, the spring tips 226 positioned proximate those address elements (i.e., proximate to address electrode 214a and address pad 212a) operate as a landing point for mirror 204. Conversely, when mirror 204 is tilted in the direction of the raised address electrode 214b and address pad 212b, the spring tips 226 on the opposite side (and hidden in the view of FIG. 1) positioned proximate those address elements operate as a landing point for mirror 204. Thus, mirror 204 may be tilted in the positive or negative direction until the mirror 204 contacts one or more spring tips 226. Light from the light source reflects off the array of mirrors 204 of the DMD 112. For a mirror tilted to one angle by the controller 114, the light reflects off the mirror and to the first optical lens 124. For a mirror tilted to a different angle by the controller 114, the reflected light from that mirror does not reach the first optical lens 124. Thus, the mirrors 204 represent "pixels" of an image that can be turned on and off by signals received from the controller 114. An image can thus be rendered using the DMD-based projector 100 by turning on and off individual mirrors 204.

Figure 3A:
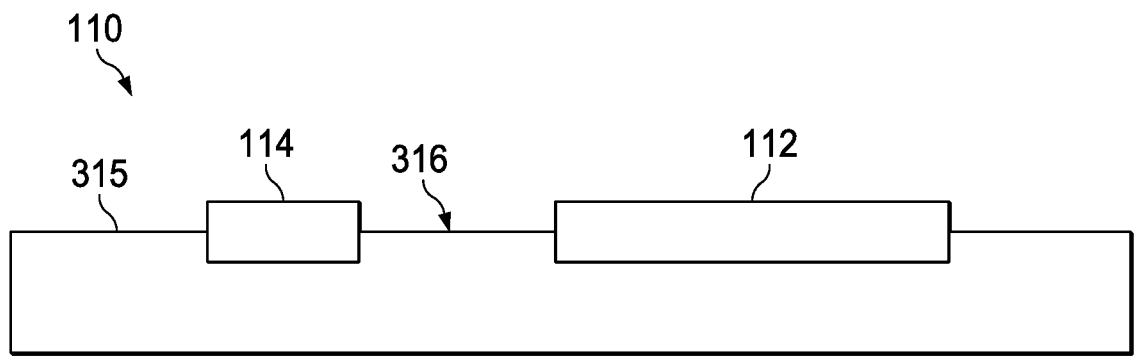
FIGS. 3A and 3B show side and top views, respectively, of a semiconductor die of the digital micromirror device-based projector including a digital micromirror device and a controller in accordance with an example.
Figure 3B:
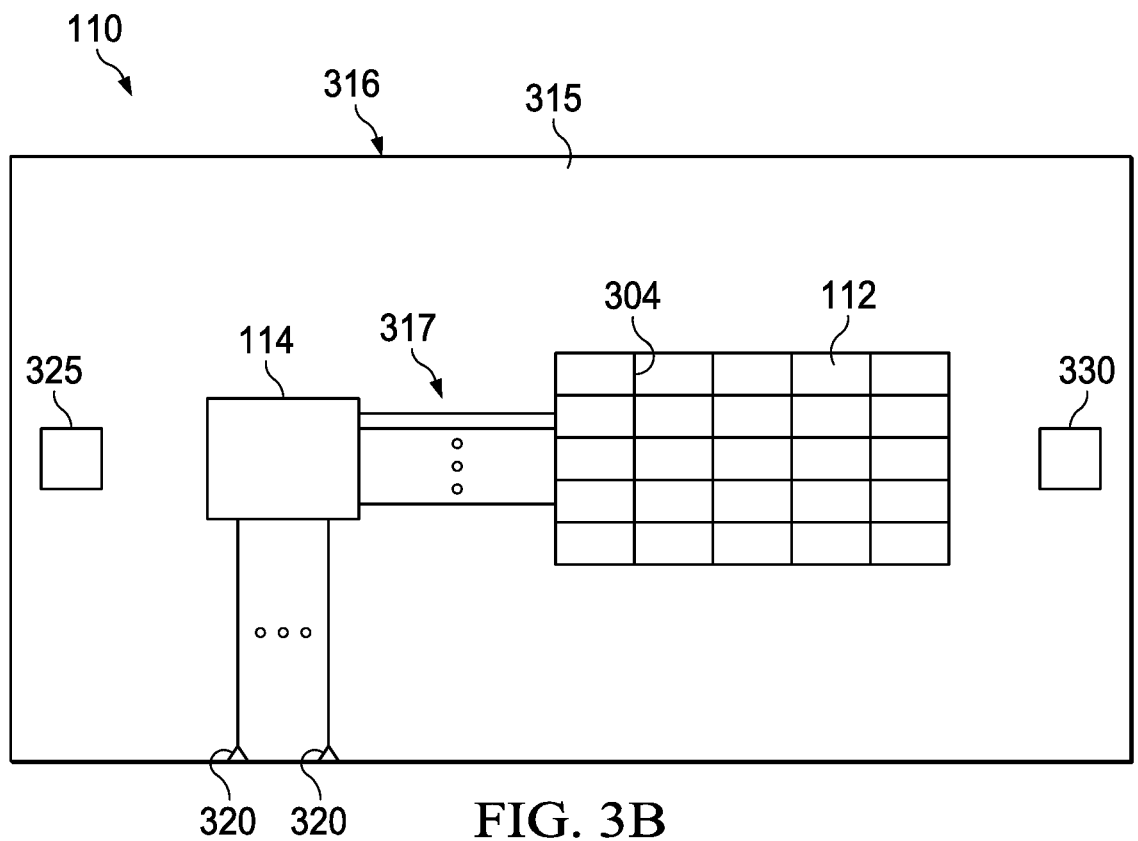

FIG. 3A illustrates a side view of the semiconductor die 110. The controller 114 and the DMD 112 are formed on a surface 315 of a semiconductor (e.g., silicon) substrate 316. FIG. 3B shows a top view of surface 315 of the semiconductor substrate 316. The DMD 112 comprises an array of mirrors 304. The particular number of mirrors 304 in FIG. 3B is an example. But more generally, the DMD 112 may have more or less than the number of mirrors 304 shown.

Through conductive pathways 317 formed in the semiconductor substrate, the controller 114 connects to the DMD 112. The controller 114 also connects to input/output pads 320 on the semiconductor die 110, so that power and control signals can be provided to the controller 114 from an external source.

Figure 4A:
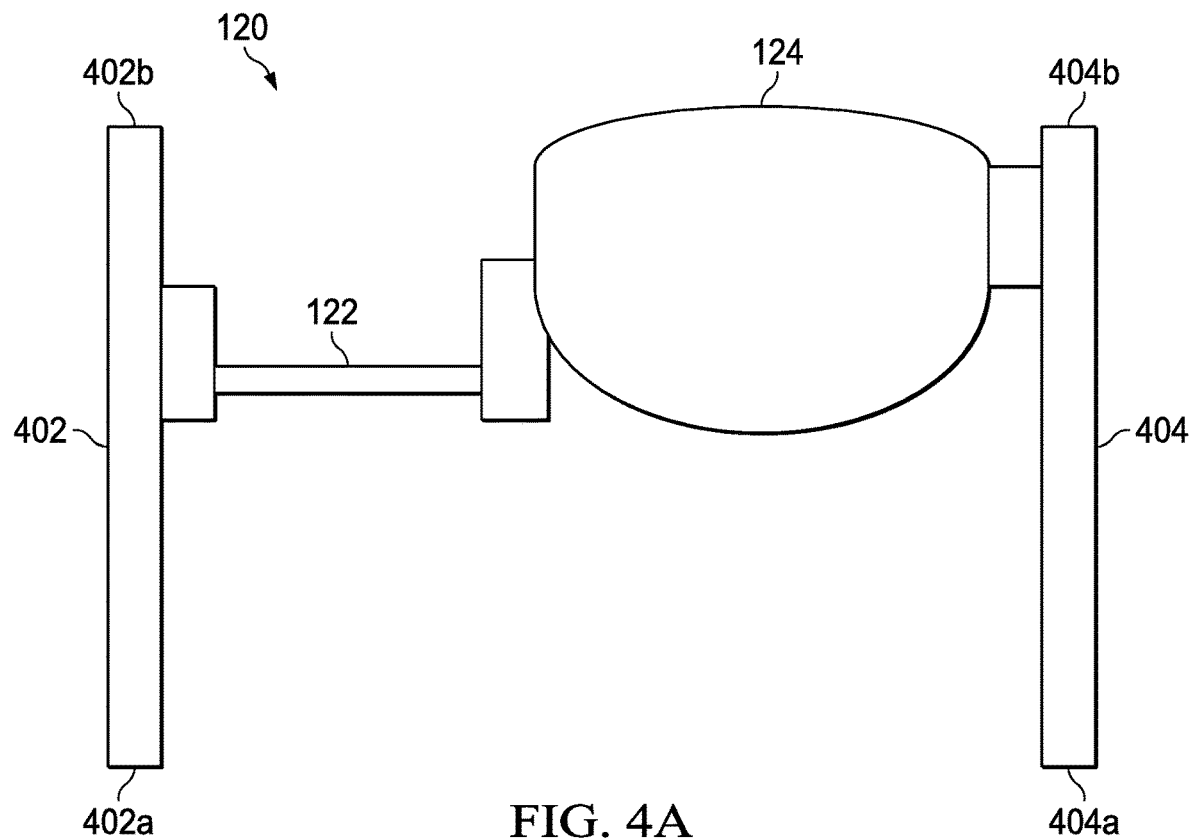
FIGS. 4A and 4B show side and top views, respectively, of a first integral optical layer of the digital micromirror device-based projector including a diffractive optical element and a lens in accordance with an example.
Figure 4B:
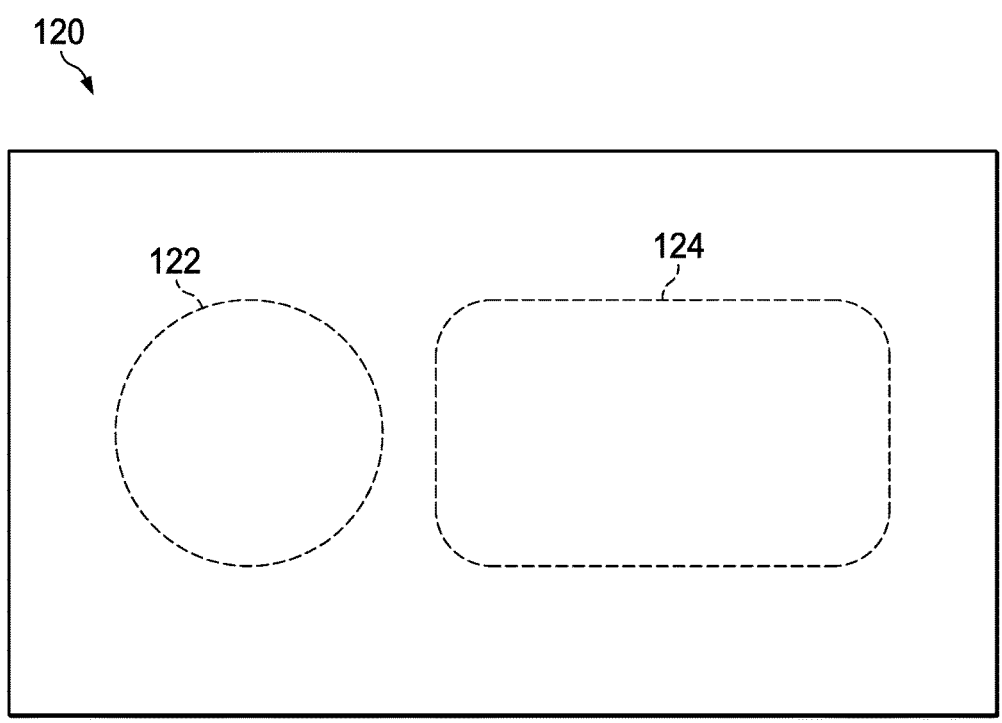

FIG. 4A shows a side view of integral optical layer 120, and FIG. 4B shows a top view of integral optical layer 120. The integral optical layer 120 is made from an optically transparent material as described above. In one example, the integral optical layer 120 is formed by injecting the optically transparent material (e.g., in liquid form) into a mold and permitting or causing the material to harden. The shape and dimensions of the mold defines the shape and dimensions of the integral optical layer 120. The first diffractive optical element 122 and the first optical lens 124 are formed as part of the fabrication process of integral optical layer 120. The mold used to form integral optical layer 120 may have curved portions to form a convex or concave surface for the first optical lens 124.

Integral optical layer 120 includes one or more mechanical registration members, such as mechanical registration members 402 and 404 formed or otherwise provided on opposite sides of the integral optical layer 120. Mechanical registration member 402 includes opposing ends 402a and 402b, and mechanical registration member 404 includes opposing ends 404a and 404b. Mechanical registration member ends 402a and 404a comprise extensions that engage receiving surfaces (e.g., mechanical receptacles) 325 and 330 on the semiconductor substrate 316 of FIG. 3B. The mechanical registration members 402, 404 help to optically align the first integral optical layer 110 to the semiconductor die 110 to create the optical path from the first diffractive optical element 122 to the DMD 112. The second and third integral optical layers 120 and 130 also include mechanical registration members to ensure that the stack of integral optical layers 120, 130, 140 and the semiconductor die 110 are all optically aligned. Further, each integral optical layer helps to provide an environmental seal for the layers below it (i.e., toward the semiconductor die 110).

Figure 5A:
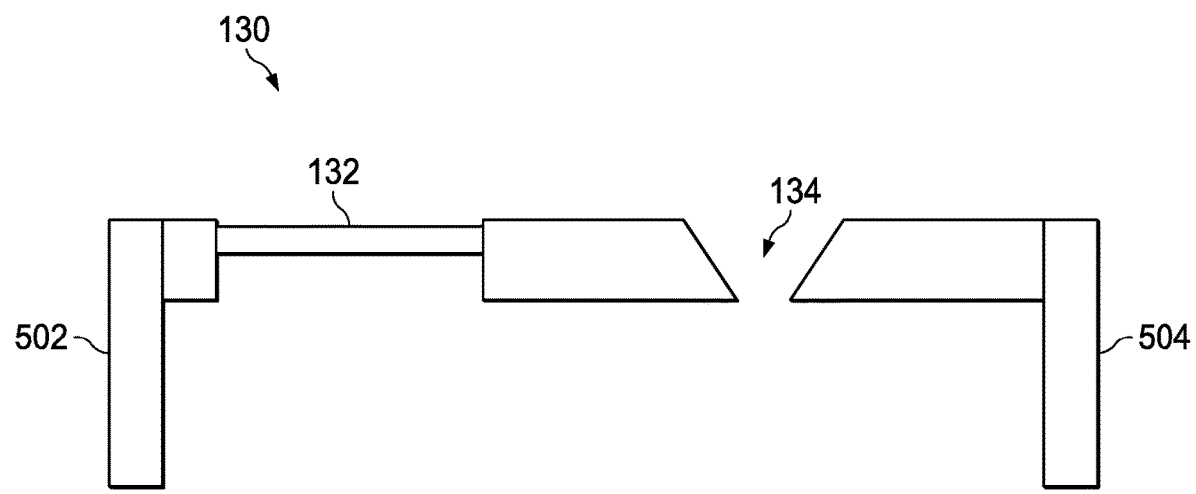
FIGS. 5A and 5B show side and top views, respectively, of a second integral optical layer of the digital micromirror device-based projector including a diffractive optical element and an aperture stop in accordance with an example.
Figure 5B:
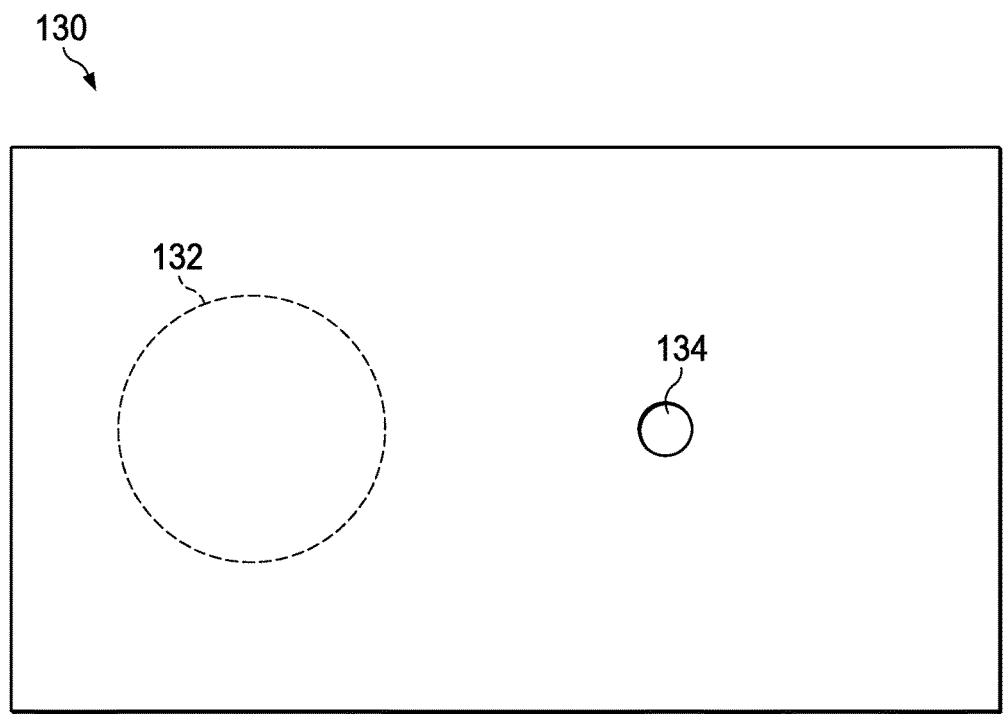

FIG. 5A shows a side view of integral optical layer 130, and FIG. 5B shows a top view of integral optical layer 130. Similar to integral optical layer 120, integral optical layer 130 is made from an optically transparent material and may be formed in much the same manner as the formation of integral optical layer 110. The formation of the integral optical layer 130 includes the formation of the second diffractive optical element 132 and the aperture stop 134. The integral optical layer 130 also includes mechanical registration members 502 and 504, which help to optically align integral optical layer 130 to adjacent integral optical layers 120 and 140.

Figure 6A:
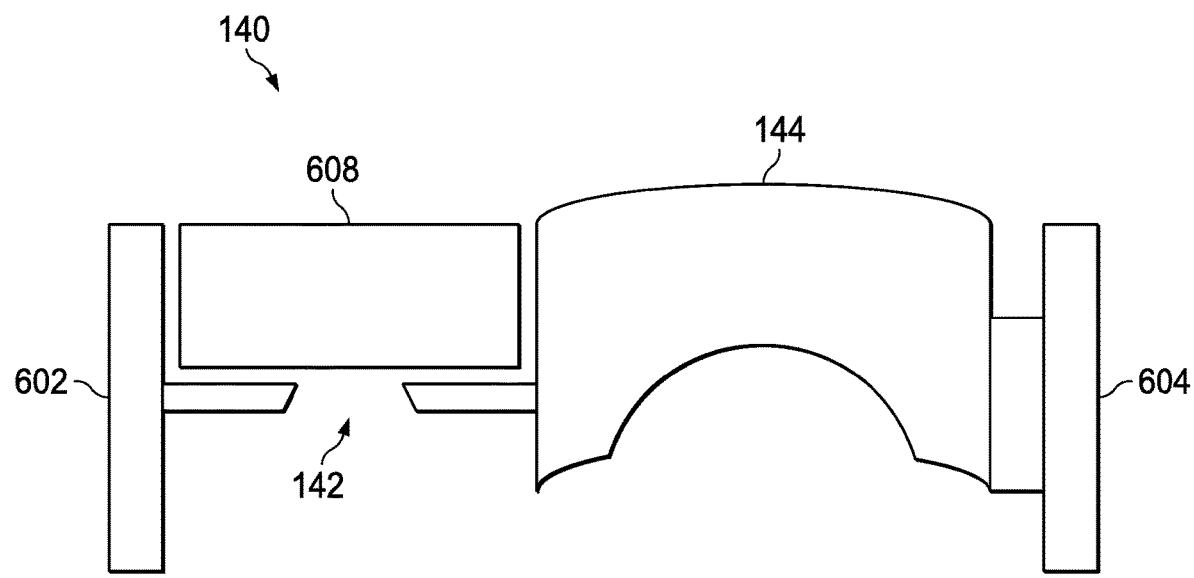
FIGS. 6A and 6B show side and top views, respectively, of a third integral optical layer of the digital micromirror device-based projector including a mount for a light source and a lens in accordance with an example.
Figure 6B:
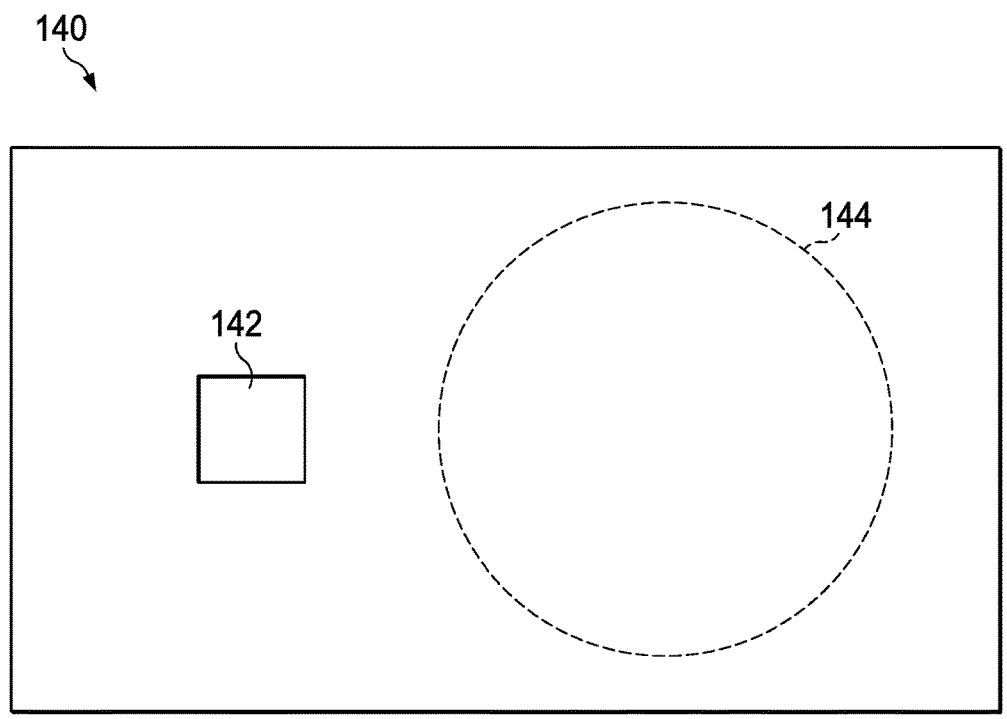

FIG. 6A shows a side view of integral optical layer 140, and FIG. 6B shows a top view of integral optical layer 140. Similar to integral optical layers 120 and 130, integral optical layer 140 is made from an optically transparent material and may be formed in much the same manner as the formation of the other integral optical layers. The formation of the integral optical layer 140 includes the formation of the light source mount 142 and the second optical lens 144. The integral optical layer 140 also includes mechanical registration members 602 and 604, which help to optically align integral optical layer 140 to adjacent integral optical layer 130. The light source mount 142 comprises an opening in the material of the integral optical layer 140 into which a light source (such as laser diode, VCSEL, LED, etc.) can be mounted. The light source (e.g., light source 608) may be attached to the mount 142 by an adhesive.

Figure 7:
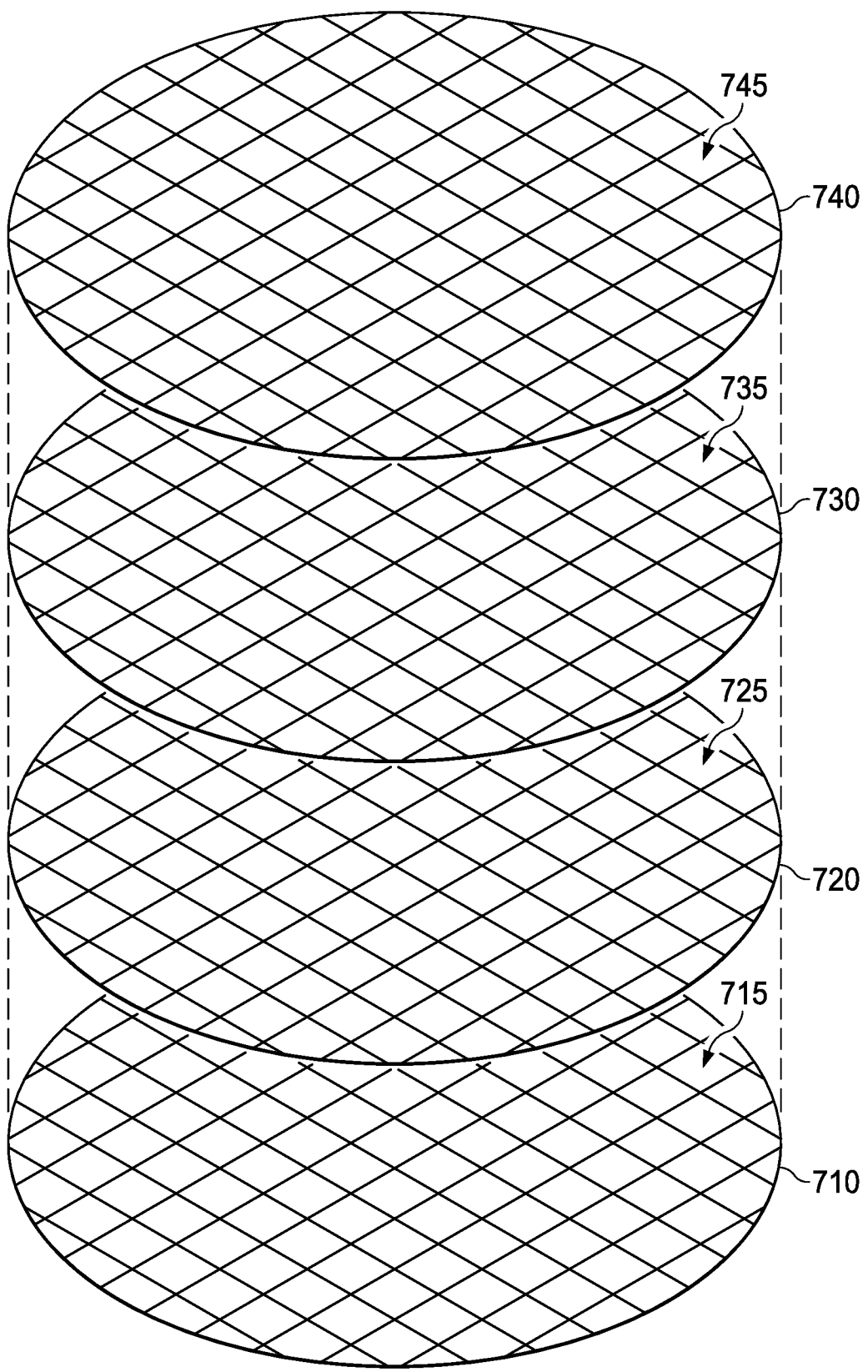
FIG. 7 illustrates the formation of the digital micromirror device-based projector using wafer level optics and a semiconductor wafer in accordance with an example.

The DMD-based projector 100 may be formed from a stack of wafers 710, 720, 730 and 740 as shown in FIG. 7. Wafer 710 is a semiconductor wafer on which multiple die 715 are fabricated. Each die 715 includes a controller 114 and a DMD 112 as described above. Optical wafers 720, 730, and 740 are made from an optically transparent material, such as plastic. Wafer 720 includes multiple cells 725, with each cell 725 comprising a respective first diffractive optical element 122 and a respective first optical lens 124. Wafer 730 includes multiple cells 735, with each cell 735 comprising a respective second diffractive optical element 132 and a respective aperture stop 134. Wafer 740 includes multiple cells 745, with each cell 745 comprising a respective light source mount 142 and a respective second optical lens 144.

The wafers 710, 720, 730 and 740 are optically aligned to each other using the mechanical registration members 402, 404, 502, 504, 602 and 604 of each cell 725, 735 and 745. In some implementations, all of the cells 725, 735 and 745 have the mechanical registration members described herein. However, in other examples, some (but not all) of the cells 725, 735 and 745 have the mechanical registration members described herein.

Figure 8:
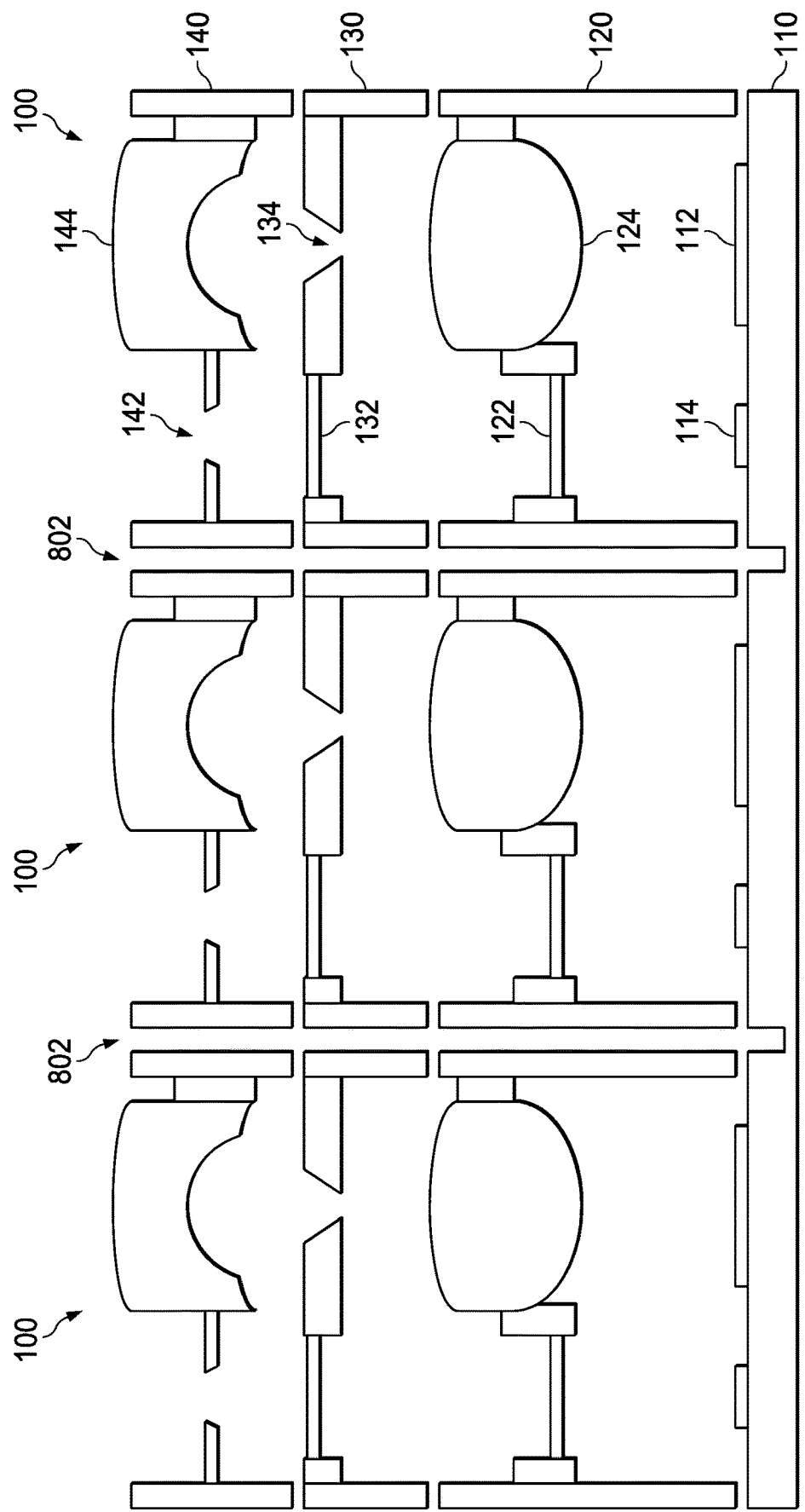
FIG. 8 illustrates several digital micromirror device-based projectors before being singulated from their constituent wafers in accordance with an example.

Adhesive is used to attach the wafers 710, 720, 730 and 740. After the wafers are attached in a stack, the individual DMD-based projectors 100 are formed by singulating the stack, so each projector includes: a respective one of the die 715; a respective one of the cells 725; a respective one of the cells 735; and a respective one of the cells 745. A light source can be installed into each DMD-based projector 100. FIG. 8 shows an example of three DMD-based projectors 100 before the DMD-based projectors 100 are singulated into separate components along boundaries 802.

Figure 9:
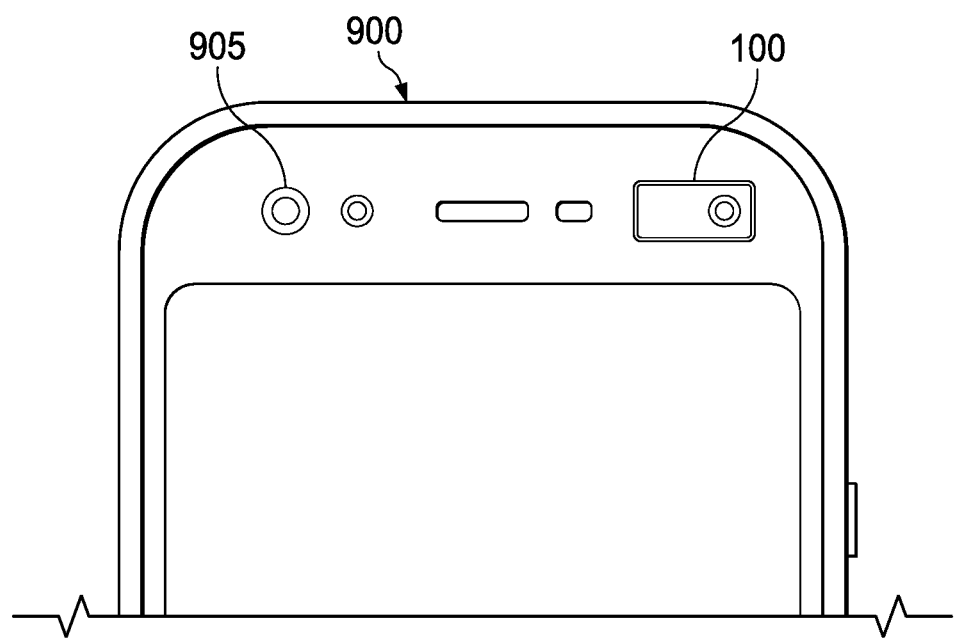
FIG. 9 illustrates a mobile communication device including a digital micromirror device-based projector in accordance with an example.

FIG. 9 illustrates an example of a use case for the DMD-based projector 100 described herein. Because the DMD-based projector 100 is constructed from wafer level optics, the projector's overall dimensions are small enough to reside within a mobile communication device, such as a smartphone 900. Within smartphone 900, an example use of the DMD-based projector 100 is to generate one or more monochromatic images for performing a 3D scan of an object. Hardware (e.g., processors) within smartphone 900 can cause a succession of static images to be rendered by the DMD-based projector 100. The smartphone's camera 905 detects reflections of the images from the object being scanned, and those reflections are processed to determine distances to various points on the object. Three-dimensional scanning does not require multiple colors of light, so the light source attached to the mount 142 may be a monochromatic light source (e.g., infrared wavelength).

Modifications are possible in the described embodiments, and other embodiments are possible, within the scope of the claims.

What is claimed is:
1. A projector, comprising:
  a semiconductor die including a digital micromirror device;
  a first integral optical layer attached to the semiconductor die, the first integral optical layer including a first optical lens and a first diffractive optical element;
  a second integral optical layer attached to the first integral optical layer, the second integral optical layer including an aperture stop and a second diffractive optical element; and a third integral optical layer attached to the second integral optical layer, the third integral optical layer including a second optical lens and a mount, and the mount adapted to be attached to a light source;

the semiconductor die, the first integral optical layer, the second integral optical layer and the third integral optical layer being stacked to form an optical path to: between the mount and the second diffractive optical element; between the second diffractive optical element and the first diffractive optical element; between the first diffractive optical element and the digital micromirror device; between the digital micromirror device and the first optical lens; between the first optical lens and the aperture stop; and between the aperture stop and the second optical lens.

2. The projector of claim 1, wherein:
the semiconductor die includes a first mechanical registration member;
the first integral optical layer includes a second mechanical registration member; and
the first mechanical registration member engages the second mechanical registration member to optically align the first integral optical layer with the semiconductor die.

3. The projector of claim 1, wherein:
the first integral optical layer includes first mechanical registration members;
the second integral optical layer includes second mechanical registration members;
the third integral optical layer includes at least one third mechanical registration member;
the semiconductor die includes at least one fourth mechanical registration member;
the fourth mechanical registration member engages at least a first one of the first mechanical registration members to optically align the first integral optical layer with the semiconductor die;
at least a first one of the second mechanical registration members engages at least a second one of the first mechanical registration members to optically align the first and second integral optical layers; and
the third mechanical registration member engages at least a second one of the second mechanical members to optically align the second and third integral optical layers.

4. The projector of claim 1, wherein the first, second and third integral optical layers include optical plastic.

5. The projector of claim 1, wherein a sum of respective thicknesses of the semiconductor die, the first integral optical layer, the second integral optical layer and the third integral optical layer is less than 7 millimeters.

6. The projector of claim 1, wherein the light source is attached to the mount of the third integral optical layer.

7. The projector of claim 6, wherein the light source includes at least one of: a laser diode, a vertical-cavity surface-emitting laser, or a light emitting diode.

8. The projector of claim 1, wherein the first integral optical layer is attached to the semiconductor die with adhesive, the second integral optical layer is attached to the first integral optical layer with adhesive, and the third integral optical layer is attached to the second integral optical layer with adhesive.

9. A projector, comprising:
a semiconductor die including a digital micromirror device and a controller, the controller coupled to the digital micromirror device and configured to provide control signals to the digital micromirror device;
a first integral optical layer including at least one of a first optical lens or a first diffractive optical element;
a second integral optical layer including at least one of an aperture stop or a second diffractive optical element; and
a third integral optical layer including at least one of a second optical lens or a mount, the mount adapted to be attached to a light source;
the semiconductor die, the first integral optical layer, the second integral optical layer and the third integral optical layer being stacked to form an optical path.

10. The projector of claim 9, wherein the digital micromirror device includes an array of mirrors having tilt angles, and the digital micromirror device is configured to control the tilt angles responsive to the control signals.

11. The projector of claim 9, wherein:
the first integral optical layer includes first mechanical registration members;
the second integral optical layer includes second mechanical registration members;
the third integral optical layer includes at least one third mechanical registration member;
the semiconductor die includes at least one fourth mechanical registration member;
the fourth mechanical registration member engages at least a first one of the first mechanical registration members to optically align the first integral optical layer with the semiconductor die;
at least a first one of the second mechanical registration members engages at least a second one of the first mechanical registration members to optically align the first and second integral optical layers; and
the third mechanical registration member engages at least a second one of the second mechanical members to optically align the second and third integral optical layers.

12. The projector of claim 9, wherein the second integral optical layer is attached to the first integral optical layer.

13. The projector of claim 9, wherein the second integral optical layer is stacked between the first and third integral optical layers.

14. The projector of claim 9, wherein the semiconductor die and the first, second and third integral optical layers are attached with adhesive.

15. The projector of claim 9, wherein the first, second and third integral optical layers include optical plastic.

16. A method of forming a projector, the method comprising:
fabricating digital micromirror devices on a semiconductor wafer;
forming first optical cells on a first integral optical layer, including forming at least one of a first diffractive optical element or a first lens in each of the first optical cells;
forming second optical cells on a second integral optical layer, including forming at least one of a second diffractive optical element or an aperture stop in each of the second optical cells;
forming third optical cells on a third integral optical layer, including forming a mount and a second lens in each of the third optical cells, the mount adapted to be attached to a light source;
attaching the semiconductor wafer and the first, second and third integral optical layers to form a stack; and
singulating the stack into separate projectors, each projector including a respective one of the digital micromirror devices, a respective one of the first optical cells, a respective one of the second optical cells, and a respective one of the third optical cells.

17. The method of claim 16, wherein attaching the semiconductor wafer and the first, second and third integral optical layers includes stacking the second integral optical layer between the first and third integral optical layers.

18. The method of claim 16, further comprising, for each of the projectors, attaching a light source to the mount.

19. The method of claim 16, wherein attaching the semiconductor wafer and the first, second and third integral optical layers includes: attaching the semiconductor wafer and the first, second and third integral optical layers with adhesive.

* * * * *